STABILITY OF OZONE ADSORBED BY SILICA GEL AND STORED UNDER PRESSURE AT 20°C

STABILITY OF OZONE ADSORBED BY SILICA GEL AT −80°C AND STORED UNDER PRESSURE AT −20°C

INVENTORS:
HERBERT K. REIMSCHUESSEL
GEORGE R. KUBANEK
GEORGE A. MOUNTFORD

ATTORNEY

STABILITY OF OZONE ADSORBED BY SILICA GEL AT −80°C AND STORED UNDER PRESSURE AT 20°C

United States Patent Office

3,514,963
Patented June 2, 1970

---

3,514,963
HANDLING AND STORAGE OF OZONE
Herbert K. Reimschuessel, Morristown, George R. Kubanek, West Orange, and George A. Mountford, Rockaway, N.J., assignors to Allied Chemical Corporation, New York, N.Y., a corporation of New York
Filed Feb. 9, 1968, Ser. No. 704,451
Int. Cl. F17c *11/00;* C01b *13/10*
U.S. Cl. 62—48                                  8 Claims

ABSTRACT OF THE DISCLOSURE

Unexpectedly high quantities of ozone can be stored adsorbed on silica gel by adsorption at a low temperature, for example −80° C., and subsequent storage at a substantially higher temperature, for example 20° C. Such a method of adsorption and storage results in substantially higher retention of ozone in the adsorbent than if the ozone had been adsorbed and stored at the higher temperature, and relatively high temperature storage allows use of the process at normal laboratory facilities.

BACKGROUND OF THE INVENTION

Ozone, $O_3$, has a molecular weight of 48, is an unstable blue gas with a characteristic pungent odor and is generally encountered in dilute form in admixture with air or oxygen. It has a melting point of −192.5° C. and a boiling point of −111.9° C. At −111.9° C. ozone condenses to a dark blue liquid.

Ozone is customarily handled as a gas in admixture with liquid oxygen, or dissolved in halogenated alkanes at low temperature. It is commercially used in the purification of drinking water, as a powerful oxidant in both organic and inorganic reactions and in the treatment of industrial waste. It is also used for the deodorization of air and sewage gases as well as for the preservation of foods in cold storage. More recently liquefied ozone has found utility as an oxidant with rocket fuels (see U.S. Patent 2,704,274).

The handling of liquid ozone during its preparation, storage, shipment and use has presented problems since it is easily exploded, as are concentrated ozone-oxygen mixtures (above about 15 weight percent ozone), in either the liquid or the vapor state. These explosions may be initiated by minute amounts of catalysts or organic matter, shock, electric spark, or sudden changes in temperature, pressure, etc.

It has been found in the past that ozone can be stored by adsorbing it on a suitable adsorbent. It was also known that the lower the adsorption temperature used, the larger the amount of ozone adsorbed and hence the larger the amount of ozone retained during storage at that temperature. Accordingly, ozone was normally adsorbed at a low temperature and stored at that temperature to prevent desorption and to prevent explosive conditions that were thought to occur due to the increase in gas phase ozone concentration which would be expected if the adsorbent were warmed to higher temperatures.

Such prior processes of adsorption and storage had the disadvantage that it was often extremely inconvenient to maintain the low adsorption temperatures, then thought to be required as the storage temperature, during transportation of the ozone and storage near the site of its use.

SUMMARY OF THE INVENTION

It is accordingly an object of this invention to provide a method for the handling and storage of ozone whereby large quantities of ozone can be stored at relatively high temperatures without build-up of explosive conditions.

It is also an object of this invention to provide a method of storing ozone which is readily adaptable to conditions and facilities which are available near the site of use of the ozone.

Other and further objects of this invention will be obvious to those skilled in the art to which it pertains from the following specification and claims.

Briefly, the process of this invention comprises:
(a) Passing a carrier gas stream containing ozone over an adsorbent in a vessel at a low temperature;
(b) Optionally pressurizing the vessel with a low-boiling gas;
(c) Sealing the vessel and storing the resultant ozone-containing adsorbent at a substantially higher temperature; and
(d) Unsealing the vessel and recovering the ozone from the adsorbent, for example, by releasing the pressure and by passing a carrier gas stream thereover.

It would normally be expected that the amount of adsorbed ozone retained on a given amount of a certain adsorbent at a given storage temperature would be about the same regardless of whether adsorption took place at the storage temperautre or at a lower temperature. However, applicants have surprisingly discovered that much greater retention occurs if adsorption is carried out at a substantially lower temperature than storage, than if adsorption and storage are carried out at the same temperature.

It is exemplary of the improvement brought about by this invention that, after adsorption on silica gel at −80° C. and storage at −20° C. for 17 days, there remained 26.2 mg. ozone per gram of silica gel, compared with the typical retention of 8.9 mg./g. for adsorption from a gas stream of the same composition at −20° C. and storage at −20° C.

The carrier gas stream which is used for adsorption and which can be used for desorption of the ozone should be inert with respect to the ozone and should be of such a nature that it does not catalyze ozone decomposition and does not significantly compete for adsorption sites with the ozone. Generally speaking, one characteristic which is indicative of the latter property is a low boiling point. Examples of gases which can be used are oxygen, nitrogen, helium, and halogenated lower alkanes such as carbon tetrafluoride. Since ozone is normally formed in admixture with oxygen, oxygen is the preferred carrier gas.

The process of adsorption can be carried out at any temperature between about room temperature and the boiling point of ozone. However, temperatures in the range between about 0° C. and about −100° C. have been found to be preferred. Above about 0° C., the amount of ozone adsorbed tends to become minimal. The lower extremity of this preferred range is dictated by the temperature attainable with convenient laboratory freezing mixtures; for example, ether-Dry Ice baths generally achieve a temperature of about −100° C.

Adsorption is normally carried out with the adsorption stream under slight pressure, for example 7 p.s.i.g., to cause flow through the vessel. However, applicants have found it to be advantageous as an optional step to pressurize the vessel even further before sealing. The gases used for pressurization should have the same characteristics as those used for adsorption and desorption. Pressures up to about 500 p.s.i.g. can be used as long as the pressurizing gas is not liquefied.

Applicants have found that the storage step of this process can be carried out anywhere in the range between the temperature of the adsorption step and about 30° C. However, the preferred temperature range for storage is between about −30° C. and 20° C. Above about 20° C. the rate of decomposition of ozone is too high for useful storage. The lower extreme of this preferred range is dictated by the temperature obtainable by easily available freezing mixtures such as magnesium nitrate-ice, which provides a temperature of about −29° C.

Applicants have found that the adsorbent which is used should have a surface area of from about 150 to about 1000 m.$^2$/g., preferably from about 500 to about 900 m.$^2$/g. Silica gel has been found to be the most suitable adsorbent, although certain other adsorbents such as the molecular sieves described in U.S. Pat. 3,006,153 and titanium dioxide can be used if extremely low storage temperatures such as −60° C. are employed. However, these latter adsorbents do not exhibit anywhere near the ozone retention of silica gel at higher temperatures.

Applicants have found that, in order to achieve optimum ozone retention, the silica gel should be pretreated by known methods to react organic impurities and to drive off adsorbed water. The former is carried out by exposing the silica gel to ozone at ambient conditions for up to about 2 hours. The latter is done by heating the gel at a temperature in the range from about 110° C. to about 190° C., preferably from about 130° C. to about 170° C., for a period of up to about 12 hours.

When it is desired to desorb the stored ozone, the storage vessel is unsealed and any pressure present in the vessel is used to expel an ozone-containing stream. After any pressure in the vessel has been utilized, a desorption carrier gas stream of the same character discussed above under adsorption carrier gas streams can be employed to recover the remaining ozone by passing the stream through the vessel and over the adsorbent.

BRIEF DESCRIPTION OF THE DRAWINGS

This invention will be more particularly described by reference to the following drawing.

DESCRIPTION OF THE PREFERRED EMBODIMENT

An oxygen stream containing ozone was obtained with a laboratory ozonator. The oxygen input to the ozonator was dried by molecular sieve traps at room temperature and in Dry Ice while the ozone-oxygen output stream was passed through an empty trap immersed in Dry Ice to remove the remaining moisture in order to keep the adsorbent dry, since it appeared that the stability of adsorbed ozone was decreased by the presence of moisture.

The adsorption and storage were carried out in stainless steel U-tubes with an internal volume of about 30 ml., each equipped with a rupture disc and pressure gauge. About 5 grams of Davison grade 04 silica gel, which had previously been ozonated and dried at 150° C., was used in each tube. Adsorption was performed in each case for one hour with an oxygen stream containing 56 mg. ozone/l. The ozone-oxygen gas stream was passed at a flow rate of about 1 liter a minute through the tube to be treated and subsequently through an ozone monitor which qualitatively indicated ozone content. Storage times varied from a few hours to 17 days.

The tests at 7 p.s.i.g. were carried out in an oxygen atomsphere, while the others were performed after pressurizing with carbon tetrafluoride. Carbon tetrafluoride was used because its low boiling point indicated that it, of all the halogenated hydrocarbons, was likely to compete least with ozone for adsorption sites on the silica gel surface.

Figure 1:
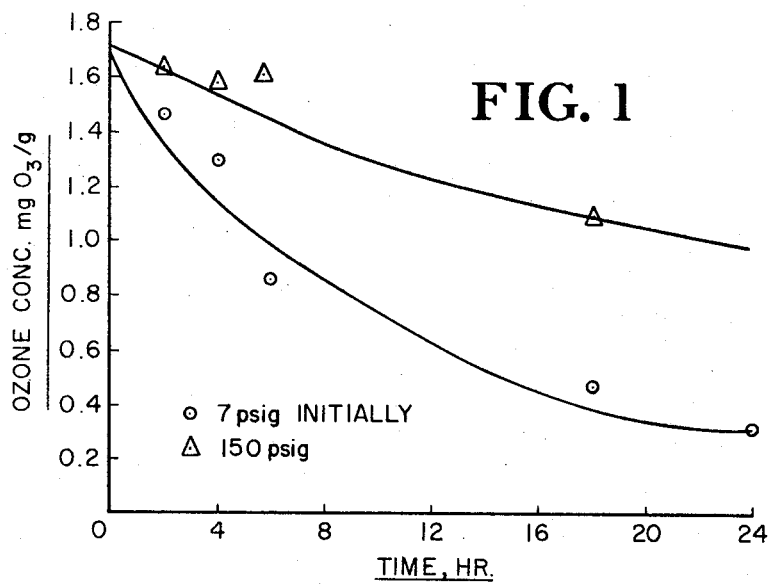
FIG. 1 is a graph of ozone concentration (expressed in milligrams of ozone retained per gram of adsorbent) versus time for ozone adsorbed at 20° C. and stored at 20° C. at low and high pressures.
Figure 2:
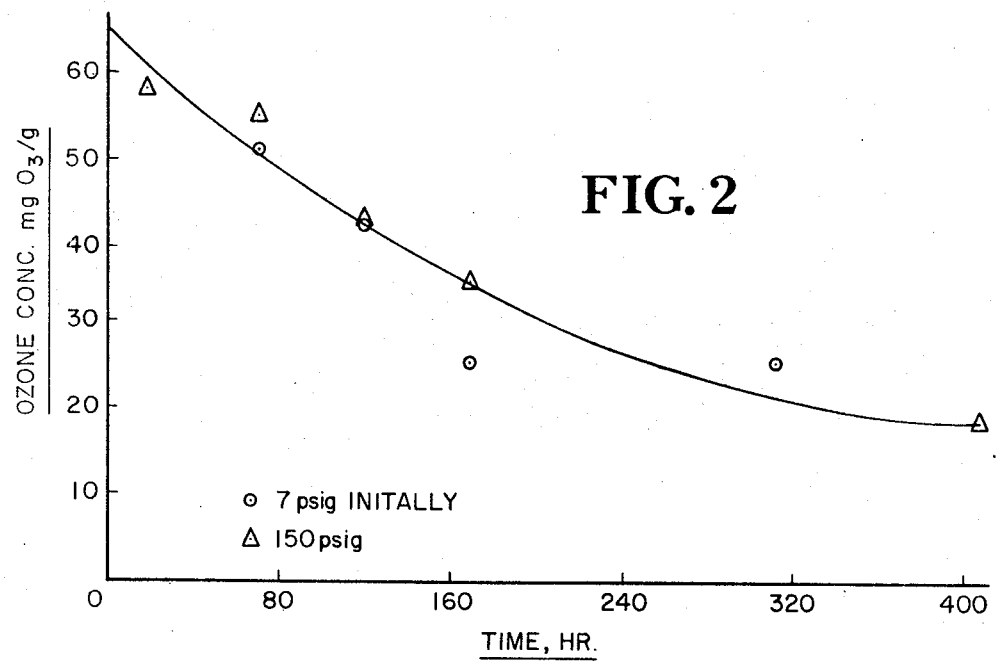
FIG. 2 is a graph of ozone concentration versus time for ozone adsorbed at −80° C. and stored at −20° C. at low and high pressures.
Figure 3:
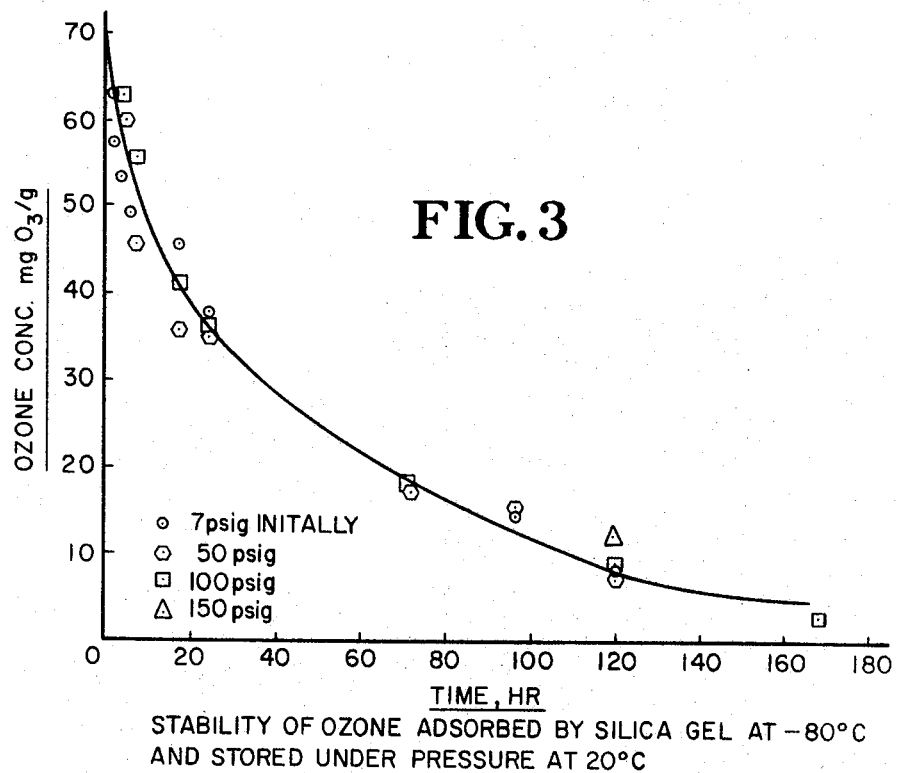
FIG. 3 is a graph of ozone concentration versus time for ozone adsorbed at −80° C. and stored at 20° C. at low and high pressures.

The results are shown in FIGS. 1–3. The adsorption temperatures applied were −80° C. and 20° C., which were realized by the use of Dry Ice-acetone and water baths respectively. Adsorption and storage were carried out either in a constant temperature bath or in an evironmental chamber whose temperature could be accurately maintained. Storage temperatures used were −20° C. and 20° C.

The ozone adsorbed by the samples in the tubes was desorbed with a stream of dry nitrogen at room temperature into potassium iodide, after the pressure had first been released through the solution.

The concentration of ozone in the gas stream was determined by passing a known volume of gas through potassium iodide solution. The method of determination of ozone was based on the quantitative oxidation of potassium iodide to iodine. The concentration of the iodide solution was varied from 2% to 6% depending upon the quantity of ozone involved. After desorption, the solution was acidified with 20 ml. of 1 M sulfuric acid, and the liberated iodine was titrated with 0.1 N or 0.02 N sodium thiosulfate solution to an endpoint with starch.

A comparison of FIGS. 1, 2 and 3 shows the great increase in retention of ozone adsorbed at a low temperature and stored at a higher one compared with the retention exhibited after adsorption and storage at the same relatively high temperature. For example, comparing FIGS. 1 and 3 of the drawings at low pressure after 20 hours of storage at 20° C. subsequent to adsorption at 20° C., the amount of ozone retained on the adsorbent was about 0.4 mg./g. By comparison, however, after adsorption at −80° C. and 20 hours of subsequent storage at 20° C., the amount of ozone retained on the adsorbent was about 38 mg./g., almost a 100-fold increase.

It may be clearly seen by the two curves of FIG. 1 that there was considerable increase in ozone retention when higher initial pressure was applied. On the other hand, the data illustrated in FIGS. 2 and 3 were found to fall on single curves. This is attributed to the fact that the system built up considerable pressure on warming up from the lower temperatures of FIGS. 2 and 3, which masked the effect of the different initial pressures.

Repeated experiments showed that explosive concentrations were not built up by low temperature adsorption followed by higher temperature storage under the conditions employed, even when the storage vessel was rapidly warmed to the higher temperature.

While the invention has been described with particular reference to specific embodiments, it is to be understood that it is not to be limited thereto but is to be construed broadly and restricted solely by the scope of the appended claims.

We claim:
1. A process for the handling and storing of ozone comprising the steps of
   (a) adsorbing gaseous ozone on an adsorbent by passing an ozone containing, low boiling, inert gas carrier stream over said adsorbent at a temperature ranging from the boiling point of ozone up to room temperature,
   (b) pressurizing said ozone containing adsorbent to a pressure of up to about 500 p.s.i.g. with a low boiling inert gas,
   (c) sealing said pressurized ozone container adsorbent from the atmosphere,
   (d) storing said sealed, pressurized, ozone containing adsorbent at a temperature ranging from the adsorption temperature up to about 30° C.,
   (e) recovering at least a portion of said adsorbed ozone from said adsorbent.

2. A process in accordance with claim 1 wherein said low boiling, inert pressurizing gas is carbon tetrafluoride.

3. A process in accordance with claim 1 wherein said low boiling inert carrier gas is oxygen.

4. A process in accordance with claim 1 wherein said adsorbent is silica gel.

5. A process in accordance with claim 4 wherein said silica gel has a surface area ranging from about 150 to about 1000 square meters per gram.

6. A process in accordance with claim 4 wherein said silica gel adsorbent is pretreated by exposing said silica gel to ozone for up to about 2 hours and thereafter heating said silica gel at a temperature of about 110° C. to 190° C. for up to about 12 hours.

7. A process in accordance with claim 1 wherein said adsorption is carried out at a temperature ranging from about 0° C. to −100° C. and wherein said storage temperature ranges from about −30° C. to 20° C.

8. A process in accordance with claim 1 wherein said ozone recovery is effected by passing a low boiling, inert carrier gas stream over said ozone containing adsorbent.

References Cited

UNITED STATES PATENTS

| | | | |
|---|---|---|---|
| 2,992,540 | 7/1961 | Grosse et al. | 62—48 |
| 3,006,153 | 10/1961 | Cook | 23—222 X |

THERON E. CONDON, Primary Examiner

N. ABRAMS, Assistant Examiner

U.S. Cl. X.R.

23—222; 53—4